(12) United States Patent
Yuan et al.

(10) Patent No.: US 12,135,720 B2
(45) Date of Patent: Nov. 5, 2024

(54) SPATIAL JOINS IN MULTI-PROCESSING COMPUTING SYSTEMS INCLUDING MASSIVELY PARALLEL PROCESSING DATABASE SYSTEMS

(71) Applicant: Teradata US, Inc., San Diego, CA (US)

(72) Inventors: Heng Yuan, San Diego, CA (US); Kranthi Kiran Reddy Patil, San Diego, CA (US); Gregory Howard Milby, San Marcos, CA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 16/718,358

(22) Filed: Dec. 18, 2019

(65) Prior Publication Data

US 2020/0401585 A1 Dec. 24, 2020

Related U.S. Application Data

(60) Provisional application No. 62/855,527, filed on May 31, 2019.

(51) Int. Cl.
  *G06F 16/2455* (2019.01)
  *G06F 16/22* (2019.01)
  *G06F 16/2453* (2019.01)

(52) U.S. Cl.
  CPC ...... *G06F 16/2456* (2019.01); *G06F 16/2282* (2019.01); *G06F 16/24532* (2019.01)

(58) Field of Classification Search
  CPC ............ G06F 16/2456; G06F 16/2282; G06F 16/24532
  See application file for complete search history.

(56) References Cited

U.S. PATENT DOCUMENTS

| | | | | |
|---|---|---|---|---|
| 5,884,320 A | * | 3/1999 | Agrawal | G06F 16/283 |
| 5,978,794 A | * | 11/1999 | Agrawal | G06F 16/2246 |
| 5,987,468 A | * | 11/1999 | Singh | G06F 16/2246 |

(Continued)

OTHER PUBLICATIONS

Jacox, Edwin H., and Hanan Samet. "Spatial join techniques." ACM Transactions on Database Systems (TODS) 32.1 (2007): 7.

(Continued)

*Primary Examiner* — Mark E Hershley
(74) *Attorney, Agent, or Firm* — Ramin Mahboubian

(57) ABSTRACT

Improved techniques for performing Spatial Joins multi-processing computing systems and environments are disclosed. One or more intersection of bounds (or limits) of data sets is determined as a join bounding space. The join bounding space is in a space (Global space or Global universe) where a spatial join between (or for) the data can be performed. The determined join bounding space can be partitioned into sub-partitions of the join bounding space. The sub-partitions of the join bounding space can assigned respectively to multiple processing unit for processing in parallel in. In addition, distribution cost information associated with the cost of distribution of the datasets (and/or their components) to the processing units of a multi-processing system can be provided and/or used to effectively distribute and/or redistribute processing of the Spatial Join between the processing units of a multi-processing system.

22 Claims, 4 Drawing Sheets

(56) References Cited

U.S. PATENT DOCUMENTS

| | | | |
|---|---|---|---|
| 6,732,107 B1* | 5/2004 | Luo | G06F 16/2448 707/999.102 |
| 6,745,198 B1* | 6/2004 | Luo | G06F 16/2264 707/999.102 |
| 7,386,561 B1* | 6/2008 | Ramesh | G06F 16/24544 707/999.102 |
| 9,256,890 B1* | 2/2016 | Schmidt | G06Q 30/0639 |
| 9,311,380 B2* | 4/2016 | Chawda | G06F 16/2471 |
| 9,555,470 B1* | 1/2017 | Heneveld | B22C 9/108 |
| 10,095,724 B1* | 10/2018 | Zhang | G06F 16/2458 |
| 2006/0100912 A1* | 5/2006 | Kumar | G06F 16/951 705/4 |
| 2009/0043726 A1* | 2/2009 | Watzke | G06F 16/283 |
| 2012/0095986 A1* | 4/2012 | Etzion | G06F 9/542 707/E17.017 |
| 2012/0121326 A1* | 5/2012 | Budd, Sr. | E01F 15/083 404/6 |
| 2012/0166423 A1* | 6/2012 | Milby | G06F 16/24542 707/718 |
| 2014/0280158 A1* | 9/2014 | Shatz | G06F 16/2462 707/737 |
| 2015/0178352 A1* | 6/2015 | Yuan | G06F 16/2246 707/797 |
| 2015/0234863 A1* | 8/2015 | Lilje | G06F 16/50 382/103 |
| 2015/0301338 A1* | 10/2015 | Van Heugten | G02B 27/0172 345/8 |
| 2015/0324373 A1* | 11/2015 | Tyercha | G06F 16/9537 707/722 |
| 2015/0324399 A1* | 11/2015 | Tyercha | G06F 16/29 707/792 |
| 2016/0004735 A1* | 1/2016 | Kazmaier | G06F 16/221 707/693 |
| 2017/0060944 A1* | 3/2017 | Khayyat | G06F 16/2237 |
| 2017/0126836 A1* | 5/2017 | Krishna | G06F 16/9535 |
| 2017/0138013 A1* | 5/2017 | Woolbright | E02D 29/0225 |
| 2018/0165331 A1* | 6/2018 | Zhang | G06F 16/24532 |
| 2019/0095272 A1* | 3/2019 | Haridas | G06F 11/0706 |
| 2019/0228362 A1* | 7/2019 | Anagnostou | G06Q 10/0635 |
| 2019/0286635 A1* | 9/2019 | Yu | G06F 16/9537 |
| 2020/0005015 A1* | 1/2020 | Liang | G06V 20/695 |
| 2022/0188365 A1* | 6/2022 | Zhang | G08G 1/205 |

OTHER PUBLICATIONS

Patel, Jignesh M., and David J. DeWitt. "Partition based spatial-merge join." ACM Sigmod Record. vol. 25. No. 2. ACM, 1996.

Zhang, Shubin, et al. "Sjmr: Parallelizing spatial join with mapreduce on clusters." Cluster Computing and Workshops, 2009. CLUSTER'09. IEEE international conference on. IEEE, 2009.

\* cited by examiner

SPATIAL JOINS IN MULTI-PROCESSING COMPUTING SYSTEMS INCLUDING MASSIVELY PARALLEL PROCESSING DATABASE SYSTEMS

CROSS-REFERENCE TO RELATED PATENT APPLICATIONS

This patent application takes priority from the U.S. Provisional Patent Application No. 62/855,527, entitled: "MASSIVELY PARALLEL PROCESSING SPATIAL JOINS (MPPSJ)" by Heng Yuan et al., filed on May 31, 2019.

BACKGROUND

In the context of computing environments and systems, data can encompass virtually all forms of information. Data can be stored in a computer readable medium (e.g., memory, hard disk). Data and in particular, one or more instances of data can also be referred to as data object(s). As is generally known in the art, a data object can for example, be an actual instance of data, a class, type, or form data, and so on.

The term database can refer to a collection of data and/or data structures typically stored in a digital form. Data can be stored in a database for various reasons and to serve various entities or "users." Generally, data stored in the database can be used by the database users. A user of a database can, for example, be a person, a database administrator, a computer application designed to interact with a database, etc. A very simple database or database system can, for example, be provided on a Personal Computer (PC) by storing data on a Hard Disk (e.g., contact information) and executing a computer program that allows access to the data. The executable computer program can be referred to as a database program or a database management program. The executable computer program can, for example, retrieve and display data (e.g., a list of names with their phone numbers) based on a request submitted by a person (e.g., show me the phone numbers of all my friends in San Diego).

Generally, database systems are much more complex than the example noted above. In addition, databases have been evolved over the years and some databases that are for various business and organizations (e.g., banks, retail stores, governmental agencies, universities) in use today can be very complex and support several users simultaneously by providing very complex queries (e.g., give me the name of all customers under the age of thirty five (35) in Ohio that have bought all items in a list of items in the past month in Ohio and also have bought ticket for a baseball game in San Diego and purchased a baseball in the past 10 years).

Typically, a Database Manager (DM) or a Database Management System (DBMS) is provided for relatively large and/or complex databases. As known in the art, a DBMS can effectively manage the database or data stored in a database, and serve as an interface for the users of the database. A DBMS can be provided as an executable computer program (or software) product as is also known in the art.

It should also be noted that a database can be organized in accordance with a Data Model. Notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A popular type of database is the relational Database Management System (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One important aspect of database systems is various database operations that they support and optimization of the database queries of the data stored in the database, as it is generally appreciated by those skilled in the art. One such database operation is generally known as a database Join operation (or "Join" as also may be referred to herein). For example, in a SQL environment, a SQL Join statement can be used to combine data or rows from two or more tables based on a common field between them. Different types of Joins include, INNER JOIN, LEFT JOIN, RIGHT JOIN and FULL JOIN. Simply put a Join operation can be used to effectively combine the information provided in database (e.g., as database tables) to address database quarriers. For example, in a database where a first database table provides information about students and their age, a second database table that provides information about the students and their favorite subjects and a third database that provides information about the students and their respective Grade Point Averages (GPA's), join operations can be suggestively applied to the tables to effectively join their information to address various database queries, including, for example, finding all the students that are age 19 with a GPA of 3.5 or higher that have "math" as their favorite subject, and so on.

A more recent form of database join operation is generally known in the as Spatial Join (or spatial join as may be used herein). Today, a Spatial Join database operation can be used in a geographic information system (GIS) that captures, stores, analyzes, manages, and presents data that is linked to location. As such, a Spatial join is a GIS operation that can affix data from one feature layer's attribute table to another from a spatial perspective. Spatial joins can begin by selecting a target feature and comparing it spatially to other feature layers. The target features can inherit the attributes from the other features if and only if the two features share the same spatial reference. Spatial join can be a way that data from one feature class can be easily added to another feature class. Most of the time a new feature can be created with combined data from one of the original feature layers. Spatial joins can form the basis for spatial databases. They allow combining information from different tables by using spatial relationships as the join key. Much of "standard GIS analysis" can be expressed as spatial joins. A spatial join can be expressed as: "R×S", where R and S are referred to as relations (e.g., database tables) to be joined together by a spatial join.

Another recent development in database systems is the use of multi-processing computing or parallel computing system, especially Massively Parallel Processing (MPP) database systems that use a relatively large number of processing units to process data in parallel.

In view of the ever-increasing need for database systems to process more and more data for various application in many different computing environments and systems, improved techniques for performing spatial joins in multi-processing database systems, especially Massively Parallel Processing (MPP) database systems, would be very useful.

SUMMARY

Broadly speaking, the invention relates to computing environments and systems. More particularly, the invention relates to improved techniques for performing Spatial Joins in multi-processing database systems. It will be appreciated that the improved techniques are highly suitable for Massively Parallel Processing (MPP) database systems.

In accordance with one aspect of the improved techniques, one or more intersection of bounds (or limits) of data sets can be determined as a join bounding space. The join bounding space cab be in a space (Global space or Global universe) where a Spatial Join between (or for) data, for example, two data sets (e.g., database tables) can be performed.

In accordance with another aspect, the determined join bounding space can be partitioned into sub-partitions of the join bounding space. The sub-partitions of the join bounding space can assigned respectively to multiple processing unit for processing in parallel in accordance with another aspect. In accordance with yet another aspect, distribution cost information associated with the cost of distribution of the datasets (and/or their components) to the processing units of a multi-processing system can be provided and/or used to effectively distribute and/or redistribute processing of the Spatial Join between the processing units of a multi-processing system. As a result, the processing of the Spatial Join can be distributed with the aim of distributing it evenly between the processing units for optimal parallel processing (or processing in parallel).

In accordance yet another aspect, join pairs (or join tasks) can be distributed (or redistributed) based on a distribution strategy in an effort to avoid relatively high distribution costs that can occur in Spatial Joins that can exceed the worst-case situations that can occur with simpler (non-spatial) join operations.

Still other aspects, embodiment and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

2B depicts a method 250 for reassigning one or more components of one first and second database sets for performing a spatial join in accordance with one embodiment.

Figure 3:
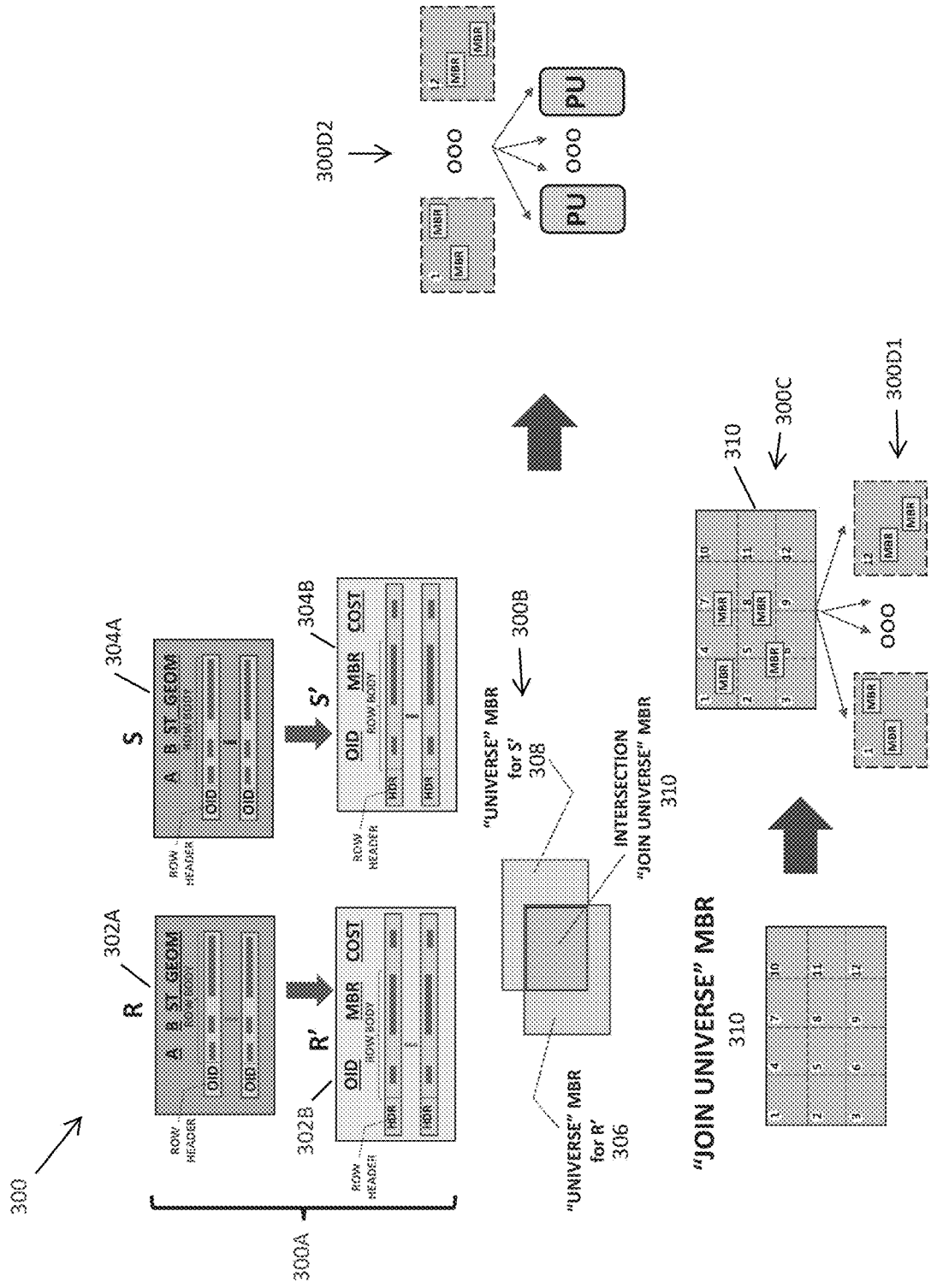

FIG. 3 depicts in greater detail operations of a spatial join in accordance with one embodiment.

DETAILED DESCRIPTION

As noted in the background section, improved techniques for performing spatial joins in multi-processing database systems, especially Massively Parallel Processing (MPP) database systems, would be very useful.

Initially, it should be noted there are a number of existing, conventional, spatial join techniques. However, conventional spatial join techniques are not highly adaptable and/or effective in multi-processing computing system and environments, especially Massively Parallel Processing (MPP) where a relatively large number of processing units are used to process data in parallel. By and large, existing spatial join techniques are not designed for Massively Parallel Processing (MPP) architectures. In addition, many of the existing spatial join techniques that the underlining database architecture includes a "R-tree", and many of the existing spatial join algorithms assume that that "R-Tree" can be built dynamically "on-the-fly. However, the underlining database architecture of a Massively Parallel Processing (MPP) architecture may not necessary include a "R-tree". As it is known in the art, "R-Tree" join algorithm ("RJ") can be considered as a conventional and possibly classic Single-Assignment, Multi-Join ("SAMJ") where both inputs can be indexed by a R-tree. R-trees are tree data structures used for spatial access methods, i.e., for indexing multi-dimensional information such as geographical coordinates, rectangles or polygons. "R-tree was proposed by Antonin Guttman in 1984 and has found significant use in both theoretical and applied contexts. A common real-world usage for an R-tree might be to store spatial objects such as restaurant locations or the polygons that typical maps are made of: streets, buildings, outlines of lakes, coastlines, etc. and then find answers quickly to queries such as "Find all museums within 2 km of my current location", "retrieve all road segments within 2 km of my location" (to display them in a navigation system) or "find the nearest gas station" (although not taking roads into account). The R-tree can also accelerate nearest neighbor search for various distance metrics, including great-circle distance." (see, for example, definition of R-tree from Wikipedia, the free encyclopedia as currently posted).

An existing conventional technique that may be more suitable for Massively Parallel Processing (MPP) environments and/or architectures than other conventional spatial join techniques, it generally known in the art as Partition Based Spatial-Merge join (PBSM) (see, for example, Patel, Jignesh M., and David J. DeWitt. "Partition based spatial-merge join." ACM Sigmod Record. Vol. 25. No. 2. ACM, 1996). For simplicity, PBSM will be summarized below in five (5) general operations (or phases or stages).

In the first (1) operation, 1: (2) for each relation associated with original entities (e.g., database tables) R and S, compute a temporary relation that includes <OID, MBR> pair:

R' and S' which will be used in the following description instead of the original relations. As it is generally known in the art "OID" can be considered a "unique identifier" and "MBR" can be considered as a "Minimum Bounding Rectangle."

In the second (2) operation: (2) Compute a join grid (i.e. "partitions"). Generally, PBSM uses a "Plane Sweep" algorithm as is known in the art.

In the Third (3) operation: (3) "Partition" the <OID, MBR> pairs in R' and S' based on the grid cells. That is, if the MBR (minimum bounding rectangle) of the spatial data row overlaps with a grid cell, then that row is distributed to that cell to perform join. It is possible.

In the Fourth (4) operation: (4) "Filter" the join within the grid cell by simply using an "MBR overlapping" test to produce a relation J' of <OIDR, OIDS> pairs. A common approach is to use a plane-sweeping algorithm. However, a "Dynamic R-tree construction" can also be used.

In the Fifth (5) operation: (5) perform "Refinement" which duplicate <OIDR, OIDS> pairs in relation J' are eliminated by sorting using OIDR as the primary sort key and then OIDS as the secondary sort key. Then the original rows in R and S are retrieved using OIDs and apply the actual spatial predicate. If the actual spatial predicate satisfies, the resulting row is inserted into output relation J.

It should be noted that PBSM was not originally designed for an MPP environment. As such, trying to adapt to a an MPP environment poses a number of challenges, including, for example: grid determination; efficient duplication eliminations; and, a suitable row distribution strategy.

One attempt to approach PBSM to MPP environment can be considered to be "Tessellation" ("Teradata Geospatial Types: Tessellation https://info.teradata.com/htmlpubs/DB_TTU_16_00/index.html#page/Teradata_Data_Types%2FB035-1181-160K%2Fesh1472241222985.html%23).

It should also be noted that another approach is a spatial nested join as implemented by Teradata Corporation, with one side of join having an R-tree, while the other side of the join gets duplicated on all Access Module Processors ("AMPs"). While performing a join in this manner cab be efficient when the number of AMPs is small, it can be cost prohibitive when the number of AMPs is relatively large such as it is the case in a typical MPP environments. In other words, this approach may be even slower than "Tessellation" approach in at least some cases. An "Access Module Processor," can be considered as a type of "vproc" (Virtual Processor) to manage a database, handle file tasks and manipulate the disk subsystem in the multi-tasking and possibly parallel-processing environment as, for example, provided by a Teradata Database from Teradata Corporation.

As for duplication elimination, one approach, Parallelizing Spatial join with Map Reduce (or MR) on clusters (SJMR) adapts PBSM into a Map Reduce (MR) environment, and basically for two MBRs that overlap, it determines which grid cell would actually handle it using a simple rule (e.g., only doing the join in the lowest grid # in which the two MBRs overlap in), so no duplicate <$OID_R$, $OID_S$> pair is generated. It thus uses duplication avoidance instead of duplication elimination. (see, for example, Zhang, Shubin, et al. "Sjmr: Parallelizing spatial join with mapreduce on clusters." Cluster Computing and Workshops, 2009. CLUSTER'09. IEEE international conference on. IEEE, 2009).

In view of the foregoing, it will be appreciated that improved techniques for performing Spatial Joins are needed and would be very useful in multi-processing computing systems and environments, especially, in MPP computing systems and environments. Accordingly, it will be appreciated that improved techniques for performing Spatial Joins multi-processing computing systems and environments can be provided.

In accordance with one aspect of the improved techniques, one or more intersection of bounds (or limits) of data sets can be determined as a join bounding space. The join bounding space cab be in a space (Global space or Global universe) where a Spatial Join between (or for) data, for example, two data sets (e.g., database tables) can be performed.

In accordance with another aspect, the determined join bounding space can be partitioned into sub-partitions of the join bounding space. The sub-partitions of the join bounding space can assigned respectively to multiple processing unit for processing in parallel in accordance with another aspect. In accordance with yet another aspect, distribution cost information associated with the cost of distribution of the datasets (and/or their components) to the processing units of a multi-processing system can be provided and/or used to effectively distribute and/or redistribute processing of the Spatial Join between the processing units of a multi-processing system. As a result, the processing of the Spatial Join can be distributed with the aim of distributing it evenly between the processing units for optimal parallel processing (or processing in parallel).

In accordance yet another aspect, join pairs (or join tasks) can be distributed (or redistributed) based on a distribution strategy in an effort to avoid relatively high distribution costs that can occur in Spatial Joins that can exceed the worst-case situations that can occur simpler (non-spatial) join operations.

Embodiments of these aspects of the invention are also discussed below with reference to FIGS. 1-3. However, those skilled in the art will readily appreciate that the detailed description given herein with respect to these figures is for explanatory purposes as the invention extends beyond these limited embodiments.

Figure 1:
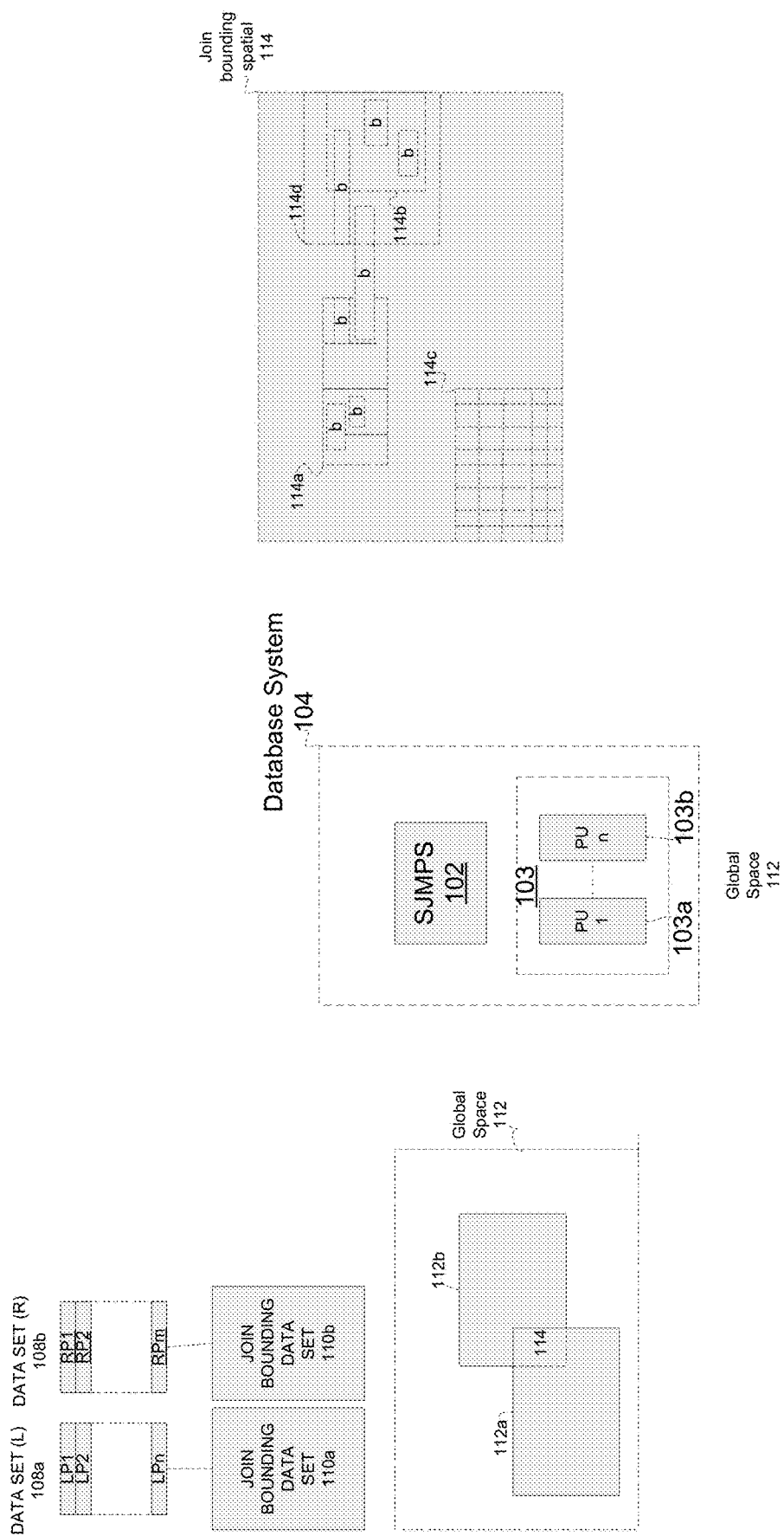
FIG. 1 depicts a multi-processing computing environment including a spatial join multi-processing processing system (SJMPS) in accordance with one embodiment.

FIG. 1 depicts a multi-processing computing environment 100 including a spatial join multi-processing processing system (SJMPS) 102 in accordance with one embodiment. It will be appreciated that the spatial join multiprocessing system (SJMPS) 102 can effectively cause the multiple processing units 103a-n in the multiprocessing computing environment 100 to perform a spatial join between two sets of data (or data sets) in parallel. In doing so, the spatial join multi-processing processing system (SJMPS) 102 can effectively assign and/or distribute one or more join operation tasks to each one of the multiple processing units 103a-n for processing in parallel.

Referring to FIG. 1, the spatial join multiprocessing system (SJMPS) 102 can, for example, be provided as or implemented at least in part as the database system 104. Those skilled in the art will readily appreciate that the database system 104 can include one or more processing units, namely the multiple processing units 103a-n, such that each of the processing units 103a-n, includes one or more physical processors configured to execute executable computer code and process data. A physical processor may also be configured to effectively provide multiple virtual processing modules. As such, the processing units 103a-n can, for example, be virtual processors modules provided by one physical processors. However, typically, in multiprocessing computing environments, especially MPP database systems, multiple physical processors are configured such that each one can provide multiple processing units (e.g., virtual processors, multiple threads) that can effectively process data in parallel. Generally, multiprocessing or parallel processing can refer to use of multiple physical processors, or multiple processing units on the same physical processor that can, for example, be provided by virtual processors or multiple threads as it is generally known in the art.

In any case, the spatial joint processing system 102 can, for example be implemented at least in part as computer hardware and or computer software (e.g., computer executable code) as those skilled in the art will readily appreciate.

Referring again to FIG. 1, the spatial join processing system (SJMPS) 102 can perform a join between two data sets, namely data set one (1) 108a and data set two (2) 108b. As shown in FIG. 1, the data sets 108a and 108b can, for example, be stored in and/or as a part of data being in a database 108. As such, the database system 104 and/or the spatial join processing system 102 can be configured and/or operable to access the data, including data sets 108a and 108B, stored in the database 108. As shown in FIG. 1, the data set 108a includes multiple parts LP1-LPN. Solely for ease of reference, data set 108a can be noted as Left (L) relation or data in connection with a Spatial Join. Similarly, the data sets 108B includes multiple parts RP1-RPN and it can be noted as the Right (R) relation or data in connection with a Spatial Join.

By way of example, datasets 108a and 108b can be database tables with rows and columns as generally prevalent in databases today. In the example, each part of the dataset 108a and 108b can correspond to a row in the database table (e.g., LP1 represents the first row of a database table to be joined, LP2 represents the second row of the same database table, and so on). As noted above, the first data set 108a can be represented as the Left (L) part of the spatial join and the second data set 108B can be represented as the Right (R) of a spatial join database operation for ease of illustration. Given that as a reference for illustration, the spatial join multi-processing system (SJMPS) 102 can effectively join parts LP1-LPN of the data sets 108a (represented as the left part of the spatial join) with the parts of the data set 108 the (presented as the right part of the spatial join).

In order to perform a spatial join of the data sets 108 and 108b, the spatial join multi-processing system (SJMPS) 102 can initially obtain a join bonding data set 110 that includes a bonding data set 110a and bonding data set 110b. The bonding data set 110a is associated with the data set 108 and it can effectively provide the bounds or limits of the dataset 109 based on the bounds or limits each one of its parts in a global spatial space (or universe) where the spatial join is to be performed. Similarly, the bonding data set 110b is associated with the data set 100b and it can effectively provide the bonds or limits of each of its parts global spatial space (or universe) where the spatial join is to be performed.

Referring again to FIG. 1, the bounds or limits of the data set 108a and 108b can be represented as parts of a global space (or universe) 112 namely, portions 112a and 112b, respectively. In other words, the spatial join multi-processing system (SJMPS) 102 can effectively determine the portions 112a and 112b in the global space (or universe) 112 for the data set 108a, and data set 100b, respectively. In doing so, the spatial join multi-processing system 102 can effectively use the bonding data sets 110a and 110b of the bonding data set 110, respectively provided for the first and second data sets 108a and 100b to determine their respective. Again, it should be noted that the spatial join processing system 102 can obtain the join bonding data 110, for example, by receiving it as input. However, it should also be noted that this spatial join multi-processing system 102 can also be configured (and/or be operable) to generate the join bonding data 110 based on the datasets 108a and 108b. By way of example, if the data sets 108a 108b are database tables with rows and columns, the bonding data can be generated as rows corresponding to the rows of the database tables. In other words, information associated with bounds and limits of the data (e.g., Minimum Bounding Rectangles (MBRs) as generally known in the art) can be determined and provided as part of the bonding data set 110a and 110b in the join bonding data. It should be noted that other information including the cost can also be provided, as will be described in greater detail below. In this example, the cost can be associated with each row of the database table and it can include the cost of the distribution of the row in multi-processing system.

Moreover, the spatial join multi-processing system 102 can effectively determine the intersection(s) of the portions 112a and 112b in the global space 112, corresponding to the spatial bounds of data sets 108b and 108b, respectively. In other words, the spatial join multi-processing system 102 can effectively determine a join bounding space 114 for the first and second data sets 108a and 108b as the intersection(s) of their respective spatial bounds 112a and 112b in the global space 112. It should be noted that the join bounding space 114 can effectively include individual spatial bounds of the parts of the data sets 108a and 108b (e.g., LP1, RP1) such that particular parts of the data set 108a and 108b (e.g., LP1 and RP1) that are needed are for performing the spatial join are in the join bounding space 104. However, the parts needed to be spatially joined may or may not be in close proximity of each other in the join bounding space 114.

Having determined the join bounding space 114 effectively as the intersection between the bounds or limits of the two data sets (112a and 112b), namely, datasets 108a and 108b, to be spatially joined by the multi-processing system (SJMPS) 102, SJMPS 102 can proceed to effectively partition the join bounding space 114 for processing by the multiple processing in parallel. As will be described below in greater detail, a number of strategies can be used to effectively partition the join bounding space 114. In general, for at least some applications, it is desirable to distribute the processing evenly between the processing units of a multi-processing units of equal processing capability in order to reduce the processing time and/or use the processing resources equally. For example, a total number of join operations can be estimated with the aim of partitioning the spatial join space into parts that would effectively require the same amount of processing time and/or power. These parts can then be effectively distributed between the processing units evenly so that each of them is assigned to perform the same amount of processing to extent possible and/or feasible.

To facilitate understanding, the operations of the multi-processing system 102 with respect to partitioning of the join bounding space 114 and assigning the partitions to the processing units 103a-103n for processing are described below in a simplified or conceptual manner before describing them in greater detail with respect to another exemplary embodiment, namely a MPP database system.

Referring back to FIG. 1, conceptually, the multi-processing system 102 can proceed to effectively partition the join bounding space 114 into multiple spatial join portions (114a, 114b, 114c, and so on) for processing by the multiple processing units 103a-n, in parallel. Then, the spatial join multi-processing system (SJMPS) 102 can further assign each one of the multiple spatial join portions that intersects, or it deemed to intersect (or likely intersect), at least a part of at least one spatial bound (or boundary) associated with a part of data set 108*a* or 108*b*, to one of the processing units for processing. For example, as depicted in FIG. 1, in a partition 114*a* of the join bounding space, multiple bounding limits of data sets 108*a* and/or 108*b* (shown in rectangles denoted by B) can be identified. Similarly, partitions 114B, 114C and 114D can include multiple bounding limits of data sets 108*a* and/or 108*b* although it is not shown in FIG. 1. It should be noted that the 114B, 114C and 114D need not be of equal size or symmetric. Also, these boundaries can be nested and/or sub-partitioned. In any case, one or more of the partitions or sub-partitions can be assigned by the spatial join multi-processing systems (SJMPS) 102 to a processing units 103*a-n* for processing in parallel.

Although the conceptually described operations described above may appear not to present many difficult challenges. In practice, several difficult problems have to be identified and solved. One problem is the strategy needed to partition the join space. One strategy would be to partition the join spatial space 114 for an even distribution between the processing units 103*a*-103*n*, as will also be described in greater detail below. In addition, in practice, a given partition strategy of a join spatial space 114 may result in having a particular part of a data set (e.g., LP3) assigned for processing to two processing units as its spatial boundary may intersect with more than one of the partitions of the join space. As such, these duplications would need to be identified and additional strategies are needed to resolve them. An even more challenging problem may be the identification and redistribution of particular parts of data need to perform a join operation for the data sets 108*a* and 108*b* (e.g., LP2 and RP2). For example, two particular parts of the data sets 108*a* and 108*b* (e.g., LP2 and RP2) may have not been in the same partition of the partitioned spatial join space 114, and, therefore may have not been assigned to the same processing unit of the processing units 103*a-n*. Consequently, in addition to identifying that both parts of a join operation are not assigned to the same processing unit, the spatial join multi-processing system (SJMPS) 102 may need to be configured to effectively redistribute one or both parts of data needed for a particular spatial join operation to the same target processing unit. In the example, one or both particular parts of the data sets 108*a* and 108*b* (e.g., LP2 and RP2) may need to be redistributed to another processing unit that may have not been initially assigned to process one or either one of them when the spatial join space 104 was partitioned, perhaps because of their relative distance from each other. As will be described in greater detail below, a cost value can be used to assist with the redistribution of the particular parts of the data sets 108*a* and 108*b* in accordance with aspect in one or more embodiments. It should be noted that cost of function may also be used in the initial partitioning of the join spatial space as will also be described in greater detail.

Figure 2A:
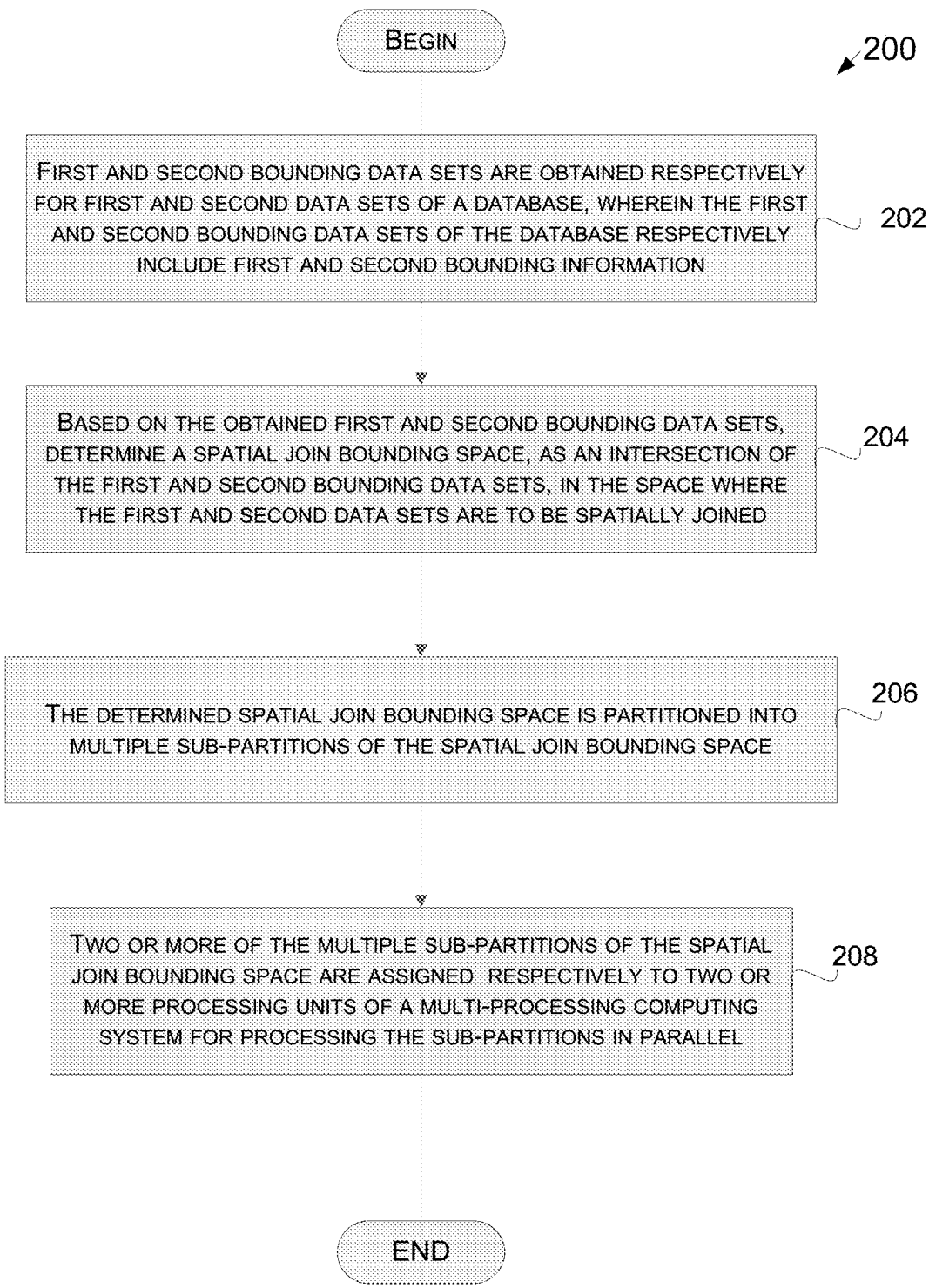
FIG. 2A depicts a method for processing a spatial join in a parallel processing computing system in accordance with one embodiment.

However, now, referring to FIG. 2A, a method 200 for processing a spatial join in a parallel processing computing system in accordance with one embodiment. It should be that the parallel processing computing system includes multiple processing units configured to process the data in parallel. Method 200 can, for example, be implemented as computer-implemented method. As such, the Method 200 can, for example, be implemented at least partly by the spatial join multi-processing system (SJMPS) 102 (shown in FIG. 1).

Referring back to FIG. 2A, initially, first and second bounding data sets are obtained 202 (e.g., determined, received, identified) respectively for first and second data sets of a database. It should be noted that the first and second bounding data sets of the database respectively include first and second bounding information. It should be noted that the first and second bounding information respectively include representation of bounds or limits of the first and second datasets in a space. The space is a space where a spatial join can be performed between the first and second data sets to effectively join at least a respective part of at one of the first and second data sets spatially in the space.

Next, based on the obtained first and second bounding data sets, a spatial join bounding space is determined (204). The bounding space can be determined as an intersection of the first and second bounding data sets in the space where the first and second data sets are to be spatially joined. In other words, as an intersection of the first and second bounding data sets as projected into a space based on their respective can be determined (204) as a spatial join bounding space, based on the obtained first and second bounding data sets.

Thereafter, the determined (204) spatial join bounding space is partitioned (206) into multiple sub-partitions of the spatial join bounding space. Again, it should be noted that the spatial join bounding space is determined (204) the first and second data sets are to be spatially joined into multiple sub-partitions of the spatial join bounding space. After the partitioning (206) of the spatial join bounding space into multiple sub-partitions of the spatial join bounding space, two or more of the multiple sub-partitions of the spatial join bounding space are assigned (208) respectively to two or more processing units of a multi-processing computing system for processing the sub-partitions in parallel. It should be noted that the multi-processing computing system includes at least one physical processor configured to provide multiple processing units to process data in parallel, thereby allowing the two or more processing units of a multi-processing computing system to process in parallel their respective assigned sub-partitions of the spatial join bounding space. The method 200 can end after the assigning (208) of the two or more of the multiple sub-partitions of the spatial join bounding space respectively to two or more processing units of a multi-processing computing system for processing the sub-partitions in parallel.

However, although not shown in FIG. 2A, it should be noted that additional operations can be performed by the Method 200. For example, after the assigning (208) of the two or more of the multiple sub-partitions of the spatial join bounding space respectively to two or more processing units of a multi-processing computing system for processing the sub-partitions in parallel, the assigned multiple sub-partitions of the spatial join bounding space can be processed, in parallel, by the two or more processing units of a multi-processing computing system. In addition, the spatial join of the first and second data sets can be performed by at least the processing, in parallel, of the assigned multiple sub-partitions of the spatial join bounding space, by the two or more processing units of the multi-processing computing system.

It should also be noted that the partitioning (206) of the determined spatial join bounding space of the first and second data sets are to be spatially joined into multiple sub-partitions of the spatial join bounding space can further comprise additional operations. These operations can, for example, include: estimating a number of component bounds there are in the spatial join bounding space, wherein each one of the component bounds represent a bound of one or more components of one of the first and second data base sets in the s spatial join bounding space; and partitioning, at least partially based on the number of component bounds, the spatial join bounding space. Typically, the aim is to partition a spatial join bounding space in a manner that would allow even distribution of processing to the multiple processing units.

Similarly, the assigning (208) of the two or more of the multiple sub-partitions of the spatial join bounding space respectively to two or more processing units of a multi-processing computing system for processing the sub-partitions in parallel can further reassign at least one of the one or more components of one of the first and second data base sets from a first one of the processing units to second one of the processing units. It should be noted that the reassigning can, for example, be made based on distribution of cost information. The cost information can, for example, be provided as a part of first and second bounding data sets respectively for the first and second data sets. For example, in one embodiment, first and second bounding data sets can be generated respectively for the first and second data sets of a database by at least generating for each one of multiple components of the first and a second data sets, their respective first and second component bounding information. In the embodiment, the first and second component bounding each can include distribution cost information associated with the cost of a component of the multiple components of the first and a second data sets between the processing units of the multi-processing system.

Again, it should be noted that in multiprocessing computing environments, especially MPP database systems, multiple physical processors are configured such that each one can provide multiple processing units (e.g., virtual processors, multiple threads) that can effectively process data in parallel. Generally, multiprocessing or parallel processing can refer to use of multiple physical processors, or multiple processing units on the same physical processor that can, for example, be provided by virtual processors or multiple threads as it is generally known in the art.

As noted above, with reference to FIG. 2A, assigning (208) of the two or more of the multiple sub-partitions of the spatial join bounding space respectively to two or more processing units of a multi-processing computing system for processing the sub-partitions in parallel, can further reassign at least one of the one or more components of one of the first and second database sets from a first one of the processing units to second one of the processing units.

Figure 2B:
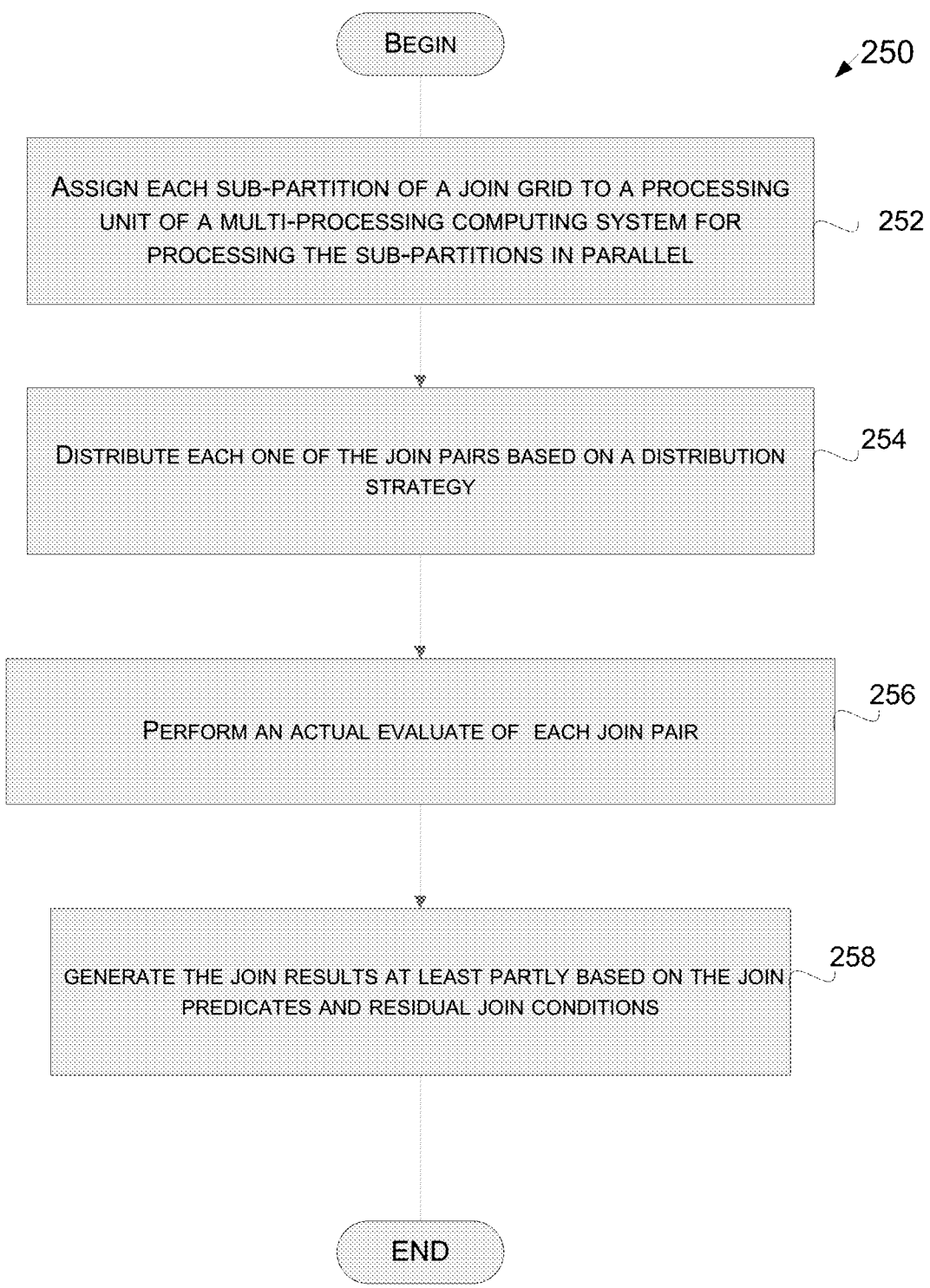

To elaborate even further, FIG. 2B depicts a method 250 for reassigning one or more components of one first and second database sets for performing a spatial join in accordance with one embodiment. Method 200 can, for example, be implemented as computer-implemented method. As such, the Method 200 can, for example, be implemented at least partly by the spatial join multi-processing system (SJMPS) 102 (shown in FIG. 1). By way of example, method 200 can effectively perform a "row distribution" to reduce or minimize the distribution cost as will be described in greater detail below.

Initially, it should be noted that that when a "join universe" is determined, a "join grid" can be determined. However, a "join" task in each grid can be considered to be different than a join task that is processed later in what can be considered as a "Refinement" phase.

As such, a "Join Task" in each "Join Grid" partition (MBR Join) can refer to a simple MBR join evaluation, as will be appreciated by those skilled in the art. Generally, it is desirable to ensure that each one of the processing units (or computing node) does not have an overwhelming number of MBR joins. As such, for example, a "plane-sweep" or "dynamic R-tree" to determine which pairs of "<OIDL, OIDR>" correspond to two (left and right) join components (e.g., rows from database tables) are potential join candidates based on whether or not their MBRs overlap.

On the other hand, another type of a "Join Task" performed later in a "Refinement" phase can be considered as an "Actual Spatial Shape Join." With each "<OIDL, OIDR>," it can effectively be determined where such spatial shapes actually overlap (not just overlap via MBR). Here, it is desirable to balance the distribution of join components (e.g., row distribution) in an effort to ensure that the cost would not be worse than a "product join" as those skilled in the art will appreciate.

Referring to FIG. 2B, initially, each sub-partition of a join grid is assigned (252) a processing unit of a multi-processing computing system for processing the sub-partition in parallel. Next, for each join pair "<OIDL, OIDR>", the pair is distributed (254) based on a distribution (or redistribution) strategy (e.g., a row distribution strategy). Thereafter, each one of the join pairs "<OIDL, OIDR>" can be (actually) evaluated (256) based on the distribution strategy. In other words, an actual evaluation (256) of each one the join pairs can be performed. Accordingly, the join results for each join pair are generated (258) at least partly based on the join predicates and residual join conditions before the method 250 ends.

As it is generally known in the art, a worst-case distribution cost for Product Join ("the simplest join") for A×B is either the distribution cost of table A, or the distribution cost of table B, given that there is no need to distribute both of the tables A and B. It should be noted that most joins in databases are some form of optimization of the product join.

However, to perform a Spatial Join, as a relatively more complex form of the Join operation, there is need to consider a "row distribution strategy," as it is possible to have a higher row distribution cost than even the product join distribution cost noted above.

For example, given, one hundred (100) rows for the table on the left (A), and one hundred (100) rows for the table on the right (B). For the product join, the worst-case distribution cost could be one hundred (100) rows. However, the result for the spatial join may not be as straight forward depending on the spatial For example, assuming the that all rows in table A and table B have the same MBR (as a worst case) and the join grid is 10×10 (i.e. 100 grid cells). Without due consideration, BOTH table A and table B could be distributed to where grid cells are located. Then the resulting distribution could actually be about 200 rows, higher than even the product join (100 rows in the example above) as it will be appreciated. It is highly desirable to avoid this type of high distribution cost that could exceed the cost of a product join, as it will also be appreciated. In an effort to avoid high distribution costs, evaluations can be made and one table can be distributed (or distributed), rather than both tables, in accordance with one aspect. As will also be described in greater detail, a distribution strategy can, for example, be a row distribution strategy (e.g., a static row distribution strategy, dynamic row distribution strategy). Also, database statistics can be used and/or generated to decide between different row distribution strategies.

To elaborate even further, FIG. 3 depicts in greater detail operations 300 of a spatial join in accordance with one embodiment. The operations 300 can, for example, be performed by a computing system. As such, the operations 300 can, for example, be performed by a spatial join multiprocessing system (SJMPS) 102 (shown in FIG. 1).

Referring to FIG. 3, consider a spatial join of R×S, where R 302A and S 304A are the relations (e.g., database tables) to be joined. Initially, at a first operation (300A), for each relation (e.g., database table) R and S, two spool files R' and S' are generated respectively that each include rows with fields: "<OID, MBR, and Cost>". Cost information can include the cost of distribution generated using, for example, a cost function which will be described further below. For a typical database, "OID" can correspond to a "Rowid" (or a row identifier as is generally known in the art). MBR is also generally known in the art and it can represent the "Minimum Bounding Rectangle" information for its respective row. In other words, information can be gathered for MBR and cost associated with each row of original relations (e.g., database table) R 302A and S 304A and generated as two spool files R' (302B) and S' (304B).

In a second operation (300B), a Join Grid is computed using the two spool files R' (302B) and S' (304B) as the Intersection "join Universe" MBR (i.e., intersection between "Universe MBR for R' (302B)" and Universe MBR for S' (304B)". It should be that in an MPP environment, a "Plane Sweep" algorithm may not be a very good approach. Instead, if accurate geospatial statistics for relations are already available, the information can be used. Otherwise, detailed statistics can be gathered "on-the-fly." Referring to FIG. 3, an evenly divided grid is shown mainly for illustration purposes, but generally non-even nested grids cab be used similar to a multi-level "Tessellation" approach. In doing so, for example, the following operations can be performed:

(i) At the same time as the R' and S' spool files are being generated, determine the encompassing "universe" MBR for R and encompassing "universe" MBR for S. Determine the "Join Universe", which is the "intersection" of the R Universe MBR and the S Universe MBR.

(ii) "Partition/divide" the Join Universe (the intersection region) into a series of grid cells. Assign each of the grid cells a GRID #.

(iii) For each grid cell, find the number of rows from R' 304B and S' 304B would overlap with the grid cell. For any grid cell is has too many rows from R 302A or S 304A, subdivide the cells. Repeat if necessary. A row count can be used to balance the compute load on different processing units for the following operation (Third operation).

In a third operation (300C) grid assignment and MBR distribution is performed. More particularly, for each row in R' and S', the following operation can be performed:

(i) Based on the rows associated MBR, determine which grid cell that row should be sent to, and assign that row a Grid Number ("GRID #") associated with that grid cell, and sent it to the appropriate Processing Unit (PU) responsible for the GRID #. Note, this assignment process can include applying one or more rules, for example: Rule A: if MBR is wholly inside a grid cell, then assign it that GRID #, and Rule B: if MBR touches boundaries or overlaps multiple grid cells, then the row are duplicated with each row assigned one of the "GRID #" corresponding to the involved grid cells.

(ii) Now distribute the rows to the corresponding Processing Unit. For MPP systems, this could mean the row including the OID/MBR pair is distributed based on the number of processing units in the MPP system, so that the amount of join tasks for each processing unit is balanced, for example, based on the statistics in the step above.

In other words, in the third operation (300C), join tasks can be evenly distributed. In doing so, based on the join grid, we can compute the join tasks in each grid cell to evenly distribute the join tasks to different processors (e.g., worker nodes). Basically, for each grid cell, it is can be determined how many MBRs from the left MBR spool overlap (or touch) the grid cell. Likewise, for the right MBR spool. Then a formula can be used to estimate the number of MBR joins in each grid cell. There are many ways to do this. For example, assuming there are a number (L) MBRs from the left MBR spool 304A that fall within a grid cell, and there are a number (R) MBRs from the right MBR spool 304B, then a Join Task estimation can perform one the following: (i) L×R, (ii) L+R, (iii) Max (L, R) to estimate the number of join tasks for the grid cell. Now, we compute the join task value in each grid cell can be determined. Then, the grid cells can be evenly distributed to the processing units (or working nodes) so that the total number of join tasks on each work node are roughly even. Next, the rows can be distributed from the left MBR spool 302B and the right MBR spool 304B to the assigned worker node based on the grid cells that overlap with their respective MBRs. It should be noted that since a MBR could overlap multiple grid cells, there can be multiple distributions of the same row. On a receiving end of the distributed MBR rows, the MBR rows can be partitioned by the grid cell so that MBR joins can be performed.

The fourth operation can be divided into two main sub-operations, namely MBR join (300D1) and Row distributions (300D2) can be performed. In the first sub-operation (300D1), when the rows have arrived at their destinations, a filtering operation can be performed in which the "join" within the grid cell can be done simply by using an MBR overlapping test, which, on behalf of a detected overlap, can produce an <OIDR, OIDS> pair. A spool-based Plane Sweep algorithm can then be used to reduce the number of MBR joins within the cell and to avoid excessive memory usage. However, unlike the PBSM algorithm, instead of simply putting the generated <OIDR, OIDS> in a spool, row distribution can be performed based on cost information in accordance with one aspect.

In other words, in the first sub-operation (300D1) of MBR Join, for each grid cell, the cell spool rows from the left are joined with the cell spool rows from the right. In doing so, it can be determined if an MBR from the left overlaps with the MBRs of the right. If they overlap, then it is a join candidate is identified. There are multiple ways of doing the MBR joins (e.g., Plane Sweep, Dynamically Building an R-tree or some other trees for one side (e.g. left cell spool MBRs), then searching the tree using the other side (e.g. right cell spool MBRs)). Generally, the goal of the MBR join is to produce a candidate join pair of "<left rowid, right row id>" for performing a join (or refinement join). Since left "Rowid" and right "Rowid" may not be on assigned to the same processing unit (e.g., an AMP), there is a need to put them on the same processing. This can be important consideration as a distribution that may be worse than a regular product join may result without otherwise.

In the second sub-operation (300D2), Row Distribution can be performed. In doing so, a number of strategies can be used to distribute rows in R and S such that they can be collocated on a same processing unit (or processing node). These strategies are discussed in greater detail below. In short. The pair <OIDR, OIDS> is distributed to the processing unit where the join can take place as will be described in the fifth operation as a Refinement Operation below, such that the rows from R and S involved are collocated, depending on the row distribution strategy. In other words, given the "<Left Rowid, Right Rowid>", now an important decision needs to be made, namely, where to perform the join (i.e., using which one the processing unit to process the join of "<Left Rowid, Right Rowid>". Here, three (3) distribution strategies can be made. Namely, depending on the decision: (i) send the join pair <Left Rowid, Right Row id> to the target worker node, and (ii) distribute left or right row based on the row id to the target worker node.

Finally, in a fifth operation (300E) join refinement operations can be performed in parallel on the processing units. In doing so, one or more of the following can be performed: (i) Sort <OIDR, OIDS> pairs and eliminate duplicates, if necessary, (ii) Using the OIDs, retrieve the rows from R and S in the local processing unit, and (iii) Apply the spatial join predicate to the just retrieved original rows wherein qualifying joins produce an associated output row, that is inserted into output relation (J).

Additional Details Regarding the Row Distribution

Additional details regarding the row distribution are discussed below. Unlike a typical product join, in which one side of the table is distributed to all the processing units based on the table/spool size, here the distribution strategy can vary in accordance with one aspect. While it is possible to distribute rows from R and S to grid cell partitions at s instead of MBRs, it can lead to significantly extra Input/Output (I/O) if the rows being distributed do not actually result in actual joins. In the worst case when the number of partitions is large, this could result in rows from R and S to be distributed to all processing units. However, this result would be even worse than the Input/Output (I/O) cost of product join that only needs one side of the table duplicated on all processing units. Thus, in operation 300C is highly desirable, if not necessary, to reduce the distribution cost.

For the fourth operation (300D1 and 300D2), the product join of MBRs with in a grid cell, given the result of r relations from R and s relations from S are to be refined in step 5, the number of join rows produced is between max(r, s) and r×s. If we simply distribute r rows from R and s rows from S to the partition, the number of row transfers is r+s. However, in most cases of typical spatial join queries, such as finding the houses in flood zones, where house shapes are stored in one table, and flood zone shapes are stored in another table, the result of spatial join is unlikely to produce r×s number of rows. It is more likely on the order of max(r, s) number of rows, since it is unlikely for a house to be in multiple flood zones, if these flood zones are non-overlapping. In these cases, the more efficient distribution is only distributing rows from R to join with S or vice versa, instead of distributing both. Also, in case of flood zones, their shapes are usually large and have a significant larger MBR which could span multiple partitions. Thus, it may not be cost effective to distribute rows from flood zone table. Occasionally, if one side of the join relations have very large spatial data, but few rows relative the number of processing units available, it may be necessary to trade off I/O cost for more balanced computational load. Thus, there are multiple row distribution strategies, depending on the nature of data, to balance the I/O and computational load. These strategies are described below.

Static Row Distribution #1

One static row distribution strategy is basically distributing rows from R and S to the processing units where the MBR join takes place. The issue here is that if the number of partitions is very large, which is necessary to avoid having any one partition having too much work, it could result in distributing both R and S to all processing units, which is worse than product join which only distribute on of the relations to all processing units. On the other hand, if the overall number of grid cell partitions having joins is small, but the number of joins in each partition result in O (r×s) number of pairs, then this approach can potentially be more efficient than other row distribution strategies.

Static Row Distribution #2

Another static row distribution is based on the average cost of distributing rows from R and S, and possibly considering the total distributing cost of rows involved in join pairs generated in step 4A, to determine if just rows from R or just rows from S should be distributed but not both. This way, the worst case of distribution is not going to be worse than product join. This row distribution strategy is suitable for cases such as finding houses in flood zones example mentioned earlier, where it is well known that flood zone shapes are significantly larger than house shapes. In case of one side of join having relatively large spatial data and few rows, it is possible to simply reverse the join direction to balance the Central Processing Unit (CPU) load at the expense of more I/O cost.

Dynamic Row Distribution

For dynamic row distribution, if CostR cost is higher than CostS, we distribute rows in S corresponding to OIDS to PUR. Otherwise, we distribute rows in R corresponding to OIDR to PUS. This allows OID (rowid) based join in Join Refinement operation to have the rows from R and S collocated in the same processing unit. To avoid redundant row distributions, the following approach can be used. First, if "CostR" cost is higher, distribute "<OIDS, PUR>" pair to PUS. Otherwise, distribute "<OIDR, PUS>" to PUR. "<OID, PU>" pair basically indicates that which row should be distributed to which processing unit. Second, when all the MBR joins are done, we can sort and eliminate duplicates of <OIDS, PUR> pairs and <OIDR, PUS> pairs. Then, distributions of rows in R and S to the corresponding processing units can be performed. One advantage of the dynamic row distribution strategy is that in cases when it is not clear that R or S have smaller row distribution costs, and there are not many overlapping shapes in R and S, then it is likely there is a join result in each partition is O(r+s). Accordingly, in this approach, the row distribution cost for each partition can be minimized.

Picking the Row Distribution Strategy

It should be noted that a Dynamic Row Distribution could effectively be the same as a Static Row Distribution #2 (noted above) if the rows in one side of join relation have significant higher distribution cost of the other side. The difference though is that there is a potential for the dynamic row distribution to have worse distribution I/O in certain cases than the static row distribution #2. The overall approach in picking the row distribution strategy can be the following:

(ii) In the optimizer, based on statistics if they are available, we can determine if one relation involved in the spatial join has significant per-row distribution costs over the other relation. If so, static distribution strategy #2 can be chosen. Otherwise, the dynamic distribution strategy can be chosen as the default. This choice can be further verified/refined later.

(ii) when statistics is gathered, optionally, histogram of distribution cost of R and S can be obtained if the distribution strategy has not been pre-determined. If one relation involved in the spatial join has significant per-row distribution costs over the other relation, static distribution #2 can be used.

(iii) If the distribution strategy has not been determined, in the fourth operation (300D), the number of join pairs generated can be checked in relation to r and s. If the number of join pairs generated is significantly larger than (r+s) and the number of partitions having joins are significantly smaller than the total number of join partitions, then static distribution strategy #1 may be a better option. Then, if significant number of rows from R have distribution costs larger than S or visa versa, the static distribution strategy #2 can be selected. Otherwise, a dynamic distribution strategy can be selected. The information generated here can be used to refine future spatial joins of the same two relations (e.g., as feedback provided to the first operation 300A). It should be noted that selecting that a distribution strategy at first sub-operation of the fourth operation (300D1) would require spooling of <OIDR, OIDS> pairs, that can have additional I/O or memory costs. As a result, future joins involving the two relations can avoid this extra cost, for example, by using a feeding back. It is also possible just use dynamic row distribution in most cases for a simpler implementation without having to spool <OIDR, OIDS> pairs. And only check if the pick is correct for future spatial joins.

Duplication Elimination

In first part of the fourth operation 300D1, a duplication avoidance strategy can be additionally used (e.g., similar to SJMR) to reduce the number of rows generated in step 4B second distribution. That is, given a join-pair, if it is determined to handle a pair by a different partition, then it can be ignored in its the current partition. Regardless of the duplication avoidance, the sorting and duplication elimination in second distribution (redistribution) would eliminate the redundant joins in the Join Refinement operation. The duplication avoidance can potentially result in fewer messages being generated.

Cost Function

For I/O costs, the base row size is part of considerations that can be made. Additionally, for Database management Systems (DBMS) with spatial LOB (large object) support, it I/O cost of LOBs can be considered. Depending on how the LOB infrastructure is implemented, it can be more expensive to transfer a LOB than an equivalent sized base row.

The various aspects, features, embodiments or implementations described above can be used alone or in various combinations. For example, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computing system, comprising: one or more processors configured to:
    obtain first and second bounding data sets respectively for first and second data sets of a database configured to store data and process database queries of the database, wherein the first and second bounding data sets of the database respectively include first and second bounding information, wherein the first and second bounding information respectively include representation of bounds or limits of the first and second datasets in a space that a spatial join operation of the database is to be performed between the first and second data sets to effectively join at least a respective part of one of the first and second data sets spatially in the space in response to one or more of the database queries of the database, and wherein the first and second bounding information include distribution cost information associated with the cost of distribution of data between two or more or the processing units of the multi-processing system;
    determine, based on the obtained first and second bounding data sets of the spatial join operation of the database, a spatial join bounding space for the spatial join operation of the database, as an intersection of the first and second bounding data sets in the space where the first and second data sets are to be spatially joined to perform the spatial join operation of the database;
    partition the determined spatial join bounding space of the first and second data sets that are to be spatially joined into multiple sub-partitions of the spatial join bounding space; and
    assign, at least partly based on the distribution cost information, two or more of the multiple sub-partitions of the spatial join bounding space respectively to the two or more processing units of a multi-processing computing system for processing the sub-partitions in parallel, wherein the two or more processing units of the multi-processing computing system includes at least one physical processor configured to provide multiple processing units to process data in parallel, thereby allowing the two or more processing units of a multi-processing computing system to process in parallel their respective assigned sub-partitions of the spatial join bounding space in order to perform the spatial join of the first and second data sets.

2. The computing system of claim 1, wherein the one or more processors are further configured to:
    effectively provide the two or more processing units of a multi-processing computing system for processing the sub-partitions;
    process, in parallel, by the two or more processing units of a multi-processing computing system, the assigned multiple sub-partitions of the spatial join bounding space; and
    perform the spatial join of the first and second data sets by at least the processing, in parallel, of the assigned multiple sub-partitions of the spatial join bounding space, by the two or more processing units of the multi-processing computing system.

3. The computing system of claim 2, wherein the partitioning of the determined spatial join bounding space of the first and second data sets are to be spatially joined into multiple sub-partitions of the spatial join bounding space further comprises:
    estimating a number of components bounds there are in the spatial join bounding space, wherein each one of the component bounds represent a bound of one or more components of one of the first and second data base sets in the spatial join bounding space; and partitioning, at least partially based on the number of component bounds, the spatial join bounding space.

4. The computing system of claim 3, wherein the assigning of the two or more of the multiple sub-partitions of the spatial join bounding space respectively to two or more processing units of a multi-processing computing system for processing the sub-partitions in parallel further comprises:

reassigning at least one of the one or more components of one of the first and second data base sets from a first one of the processing units to second one of the processing units.

5. The computing system of claim 1, wherein the one or more processors are further configured to:

receive the first and second data sets of a database;

generate the first and second bounding data sets respectively for the first and second data sets of a database by at least generating for each one of multiple components of the first and a second data sets, their respective first and second component bounding information.

6. The computing system of claim 5, wherein the first and second component bounding each include distribution cost information associated with the cost of a component of the multiple components of the first and a second data sets between the processing units of the multi-processing system.

7. The computing system of claim 6, further comprising reassigning of at least one of the one or more components of one of the first and second data sets from a first one of the processing units to second one of the processing units.

8. A computer-implemented method of processing spatial joins of data in a parallel processing computing system, wherein the parallel processing computing system includes one or more processors configured to provide multiple processing units configured to process data in parallel, and wherein the computer-implemented method comprises:

obtaining first and second bounding data sets respectively for first and second data sets of a database, wherein the first and second bounding data sets of the database respectively include first and second bounding information, and wherein the first and second bounding information respectively include representation of bounds or limits of the first and second datasets in a space that a spatial join can be performed between the first and second data sets to effectively join at least a respective part of at one of the first and second data sets spatially in the space, and wherein the first and second bounding information include distribution cost information associated with the cost of distribution of data between two or more or the processing units of the multi-processing system;

determining, based on the obtained first and second bounding data sets, a spatial join bounding space, as an intersection of the first and second bounding data sets, in the space where the first and second data sets are to be spatially joined;

partitioning the determined spatial join bounding space of the first and second data sets are to be spatially joined into multiple sub-partitions of the spatial join bounding space; and assigning two or more of the multiple sub-partitions of the spatial join bounding space respectively to two or more processing units of a multi-processing computing system for processing the sub-partitions in parallel, wherein the multi-processing computing system includes at least one physical processor configured to provide multiple processing units to process data in parallel, thereby allowing the two or more processing units of a multi-processing computing system to process in parallel their respective assigned sub-partitions of the spatial join bounding space.

9. The computer-implemented method of claim 8, wherein the computer-implemented method further comprises:

effectively providing the two or more processing units of a multi-processing computing system for processing the sub-partitions: processing, in parallel, by the two or more processing units of a multi-processing computing system, the assigned multiple sub-partitions of the spatial join bounding space; and performing the spatial join of the first and second data sets by at least the processing, in parallel, of the assigned multiple sub-partitions of the spatial join bounding space, by the two or more processing units of the multi-processing computing system.

10. The computer-implemented method of claim 9, wherein the assigning of the two or more of the multiple sub-partitions of the spatial join bounding space respectively to two or more processing units of a multi-processing computing system for processing the sub-partitions in parallel further comprises:

reassigning at least one of the one or more components of one of the first and second data base sets from a first one of the processing units to a second one of the processing units.

11. The computer-implemented method of claim 8, wherein the partitioning of the determined spatial join bounding space of the first and second data sets are to be spatially joined into multiple sub-partitions of the spatial join bounding space further comprises:

estimating a number of components bounds there are in the spatial join bounding space, wherein each one of the component bounds represent a bound of one or more components of one of the first and second data base sets in the s spatial join bounding space; and partitioning, at least partially based on the number of component bounds, the spatial join bounding space.

12. The computer-implemented method of claim 8, wherein the computer-implemented method further comprises:

receiving the first and second data sets of a database;

generating the first and second bounding data sets respectively for the first and second data sets of a database by at least generating for each one of multiple components of the first and a second data sets, their respective first and second component bounding information.

13. The computer-implemented method of claim 12, wherein the first and second component bounding information each include distribution cost information associated with the cost of a component of the multiple components of the first and a second data sets between the processing units of the multi-processing system.

14. The computer-implemented method of claim 12, further comprising reassigning at least one of the one or more components of one of the first and second data base sets from a first one of the processing units to second one of the processing units.

15. The computer-implemented method of claim 14,
wherein the first and second data sets include first and second database tables; and
wherein the reassigning of the at least one of the one or more components of one of the first and second data base sets from a first one of the processing units to second one of the processing units further comprises:

not distributing rows of the first database to the processing units for processing.

16. The computer computer-implemented method of claim 8, wherein the processing units include one or more or the following: multiple virtual processors, and multiple threads.

17. A computer-implemented method of processing a spatial join in a parallel processing computing system, wherein the parallel processing computing system includes one or more processors configured to provide multiple processing units configured to process data in parallel, and wherein the computer-implemented method comprises:

assigning each sub-partition of a join grid, as a join pair, to a processing unit of a multi-processing computing system for processing the sub-partitions in parallel;

distributing each one of the join pairs, in the join grid, based on a distribution strategy;

performing an evaluation of the distribution strategy for each one of the distributed join pairs; and reassigning one or more of the distributed join pairs, in the join grid, based on the evaluation of the distribution strategy;

generating, for each one of the join pairs, at least one join result at least partly based on the following: (i) one or more spatial join predicates of the spatial join, and (ii) one or more spatial residual join conditions of the spatial join.

18. The computer-implemented of claim 17, wherein the distribution strategy is a row distribution strategy for distributing rows of one or more database tables involved in the spatial join.

19. The computer-implemented of claim 18, wherein row distribution strategy is a static row distribution strategy.

20. The computer-implemented of claim 18, wherein row distribution strategy is a dynamic row distribution.

21. The computer-implemented of claim 18, wherein the dynamic row distribution strategy is determined at least partly based on the database statistics by at least performing the following:

determining whether database geospatial statistics is available;

using the available database geospatial statistics to determine the dynamic row distribution strategy if it determined that the database geospatial statistics is available;

generating database geospatial statistics if it determined that the database statistics is not available; and using the generated database geospatial statistics to determine the dynamic row distribution strategy if it determined that the database geospatial statistics is not available.

22. A non-transitory computer readable storage medium storing at least executable computer code for processing spatial joins of data in a parallel processing computing system, wherein the parallel processing computing system includes one or more processors configured to provide multiple processing units configured to process data in parallel, and wherein when the executable computer code is executed it performs at least the following:

obtain first and second bounding data sets respectively for first and second data sets of a database, wherein the first and second bounding data sets of the database respectively include first and second bounding information, wherein the first and second bounding information respectively include representation of bounds or limits of the first and second datasets in a space that a spatial join can be performed between the first and second data sets to effectively join at least a respective part of at one of the first and second data sets spatially in the space, and wherein the first and second bounding information include distribution cost information associated with the cost of distribution of data between two or more or the processing units of the multi-processing system;

determine, based on the obtained first and second bounding data sets, a spatial join bounding space, as an intersection of the first and second bounding data sets, in the space where the first and second data sets are to be spatially joined;

partition the determined spatial join bounding space of the first and second data sets are to be spatially joined into multiple sub-partitions of the spatial join bounding space; and assign two or more of the multiple sub-partitions of the spatial join bounding space respectively to two or more processing units of a multi-processing computing system for processing the sub-partitions in parallel, wherein the multi-processing computing system includes at least one physical processor configured to provide multiple processing units to process data in parallel, thereby allowing the two or more processing units of a multi-processing computing system to process in parallel their respective assigned sub-partitions of the spatial join bounding space.

* * * * *